A. H. BASTIAN.
PORTABLE SAWING MACHINE.
APPLICATION FILED FEB. 14, 1918.
1,294,222.
Patented Feb. 11, 1919.
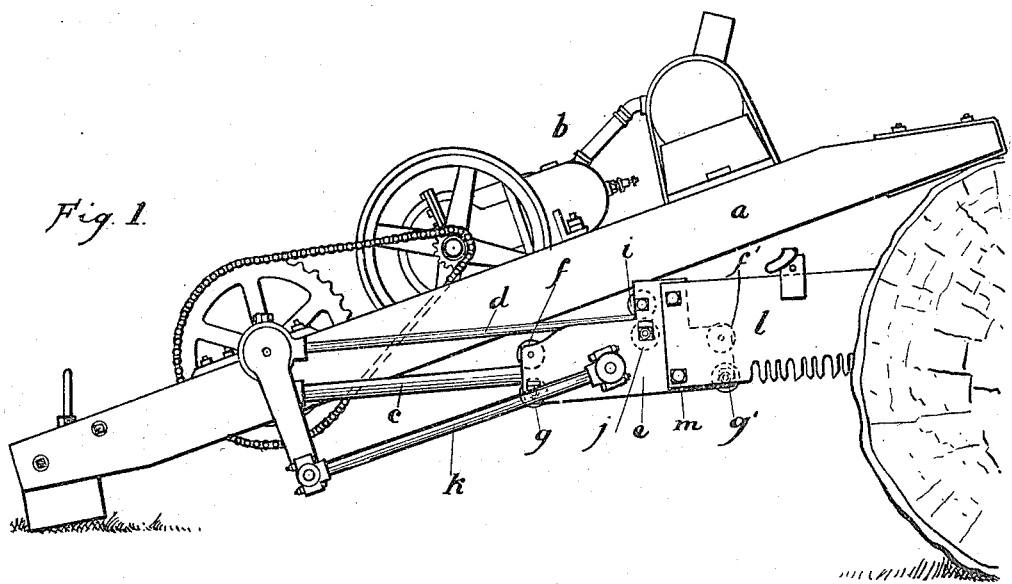
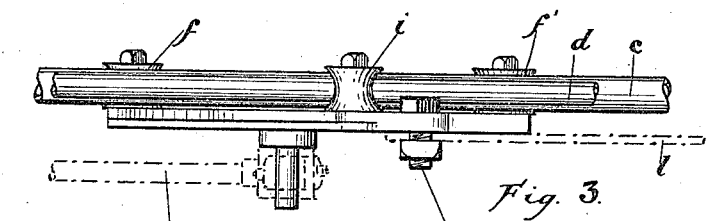
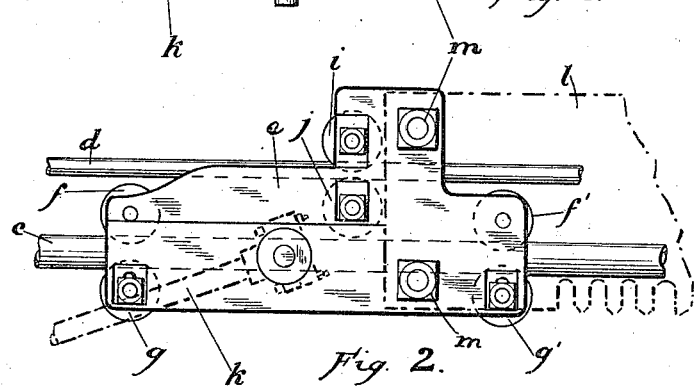
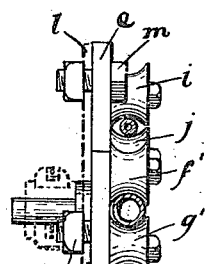
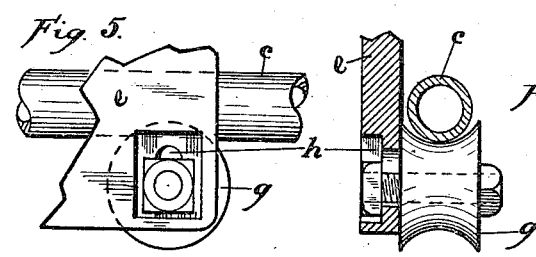
Inventor:
August H. Bastian
by
Atty.

UNITED STATES PATENT OFFICE.

AUGUST H. BASTIAN, OF HILLSDALE, OREGON.

PORTABLE SAWING-MACHINE.

1,294,222.
Specification of Letters Patent.
Patented Feb. 11, 1919.

Application filed February 14, 1918. Serial No. 217,256.

*To all whom it may concern:*

Be it known that I, AUGUST H. BASTIAN, a citizen of the United States, and a resident of Hillsdale, Multnomah county, State of Oregon, have invented a certain new and useful Improvement in Portable Sawing-Machines, of which the following is a specification.

My invention relates to reciprocating portable sawing machines and other devices which include a reciprocating cross-head. The object of my invention is to provide simpler and cheaper means for reciprocably supporting the cross-head. Incidentally I increase the durability, and also the efficiency, of these parts, by so arranging the relatively sliding surfaces as to keep them in good condition.

Heretofore the sliding surfaces consisted, one, of polished steel rods, and the other having babbitt bearing faces. In the use of such devices in the open frequently grit and dirt would work in the sliding surfaces, and so impose undue friction and wear. The polished steel-rods and the babbitt faces also involve considerable expense.

In my improvement I use common gas pipe for the guide-rods, and mount the cross head on such guide-rods by means of friction rollers arranged to bear on opposite faces of the guide-rods; and the friction rollers bearing on one side are made adjustable so as to be able to removably mount the cross-head on the guide-rod, and also take care of the wear.

In the accompanying drawings:

Figure 1 is a side elevation of a portable sawing machine embodying my improvement;

Fig. 2 is an enlarged detail of the guide rods and the cross-head thereon mounted;

Fig. 3 is a top view of the parts shown in Fig. 2, the pitman rod and the saw being shown in dotted outline in the last two views;

Fig. 4 is an end view looking from right to left at Fig. 2; and

Figs. 5 and 6 are details of construction hereinafter fully described.

$a$ is the saw frame on which is mounted the usual engine $b$, and its connections, the details of which are immaterial, those shown in Fig. 1 illustrating a common type. $c$ is the lower guide-rod, and $d$ the upper guide-rod, which may be made of common gas pipe. On these guide-rods is reciprocably mounted the cross-head $e$. The cross-head is provided in its lower part, at its opposite ends, with friction-rolls, $f$, $f'$, $g$, $g'$, bearing on opposite sides of the guide-rod $c$. The friction-rollers may be mounted by means of stud-bolts. The stud-bolts of the lower roller $g$, $g'$ bear in slots $h$ of the cross-head, so that these rollers may be moved toward and from the guide-rod $c$. Intermediate the friction rollers, provided on the lower part of the cross-head $e$, are two friction-rollers $i$, $j$, bearing on opposite sides of the guide-rod $d$. The purpose of making the friction-rollers $i$, $g$, $g'$ adjustable, as mentioned, is to permit the cross-head to be removably mounted on the guide-rods. It is furthermore especially contrived for taking up wear of the rollers in service, and in this way providing for the maintaining of the machine in efficient condition indefinitely. The pitman $k$ is fastened to the cross-head in any convenient manner, and the saw $l$ is fastened on the cross-head by bolts $m$, or otherwise as convenient.

I claim:

1. In a reciprocating engine, the combination of two parallel guide rods and a cross-head thereon, friction rollers at the ends of the lower part of the cross-head. such rollers bearing on opposite faces of one guide rod, and other guide rollers on the cross-head, located intermediate said first mentioned guide rollers and bearing on the opposite sides of the other guide rod.

2. In a reciprocating engine, the combination of two parallel guide rods and a cross-head thereon, friction rollers at the ends of the lower part of the cross-head, such rollers bearing on opposite faces of one guide rod, the rollers bearing on one side of such guide rod being adjustable to the latter, and other guide rollers on the cross-head, located intermediate said first mentioned guide rollers and bearing on the opposite sides of the other guide rod, one of the latter rollers being adjustable to its related guide rod.

AUGUST H. BASTIAN.

Copies of this patent may be obtained for five cents each, by addressing the "Commissioner of Patents, Washington, D. C."